United States Patent
Chou

(10) Patent No.: US 7,308,730 B2
(45) Date of Patent: Dec. 18, 2007

(54) BASE MEMBER FOR SWIVEL CASTER

(75) Inventor: Chuan-Hai Chou, Taipei Hsien (TW)

(73) Assignee: Haion Caster Industrial Co., Ltd., Taipei Hsien (TW)

( * ) Notice: Subject to any disclaimer, the term of this patent is extended or adjusted under 35 U.S.C. 154(b) by 188 days.

(21) Appl. No.: 11/165,060

(22) Filed: Jun. 24, 2005

(65) Prior Publication Data

US 2006/0288524 A1  Dec. 28, 2006

(51) Int. Cl.
*B60B 33/00* (2006.01)
*F16C 43/06* (2006.01)

(52) U.S. Cl. .............. 16/21; 16/20; 16/30; 16/38; 384/507; 384/508

(58) Field of Classification Search ......... 16/18 R, 16/31 R, 31 A, 20, 21, 28, 24–26, 46; 403/270, 403/335, 155, 154; 280/642, 647, 650, 38, 280/47; 108/177, 189; 384/507, 508
See application file for complete search history.

(56) References Cited

U.S. PATENT DOCUMENTS

| 545,068 | A | * | 8/1895 | Gaffney | 16/26 |
|---|---|---|---|---|---|
| 2,530,660 | A | * | 11/1950 | Hoeffleur | 384/508 |
| 2,972,162 | A | * | 2/1961 | Townsend | 16/26 |
| 4,402,108 | A | * | 9/1983 | Pannwitz | 16/26 |
| 5,033,873 | A | * | 7/1991 | Suzuki | 384/447 |
| 5,096,308 | A | * | 3/1992 | Sundseth | 384/49 |
| 5,097,565 | A | * | 3/1992 | Shorey | 16/48 |
| 6,076,972 | A | * | 6/2000 | Yuasa et al. | 384/508 |
| 6,588,059 | B1 | * | 7/2003 | McCord | 16/30 |
| 7,156,769 | B2 | * | 1/2007 | Kingston et al. | 475/331 |
| 2006/0200937 | A1 | * | 9/2006 | Ruckman et al. | 16/20 |

FOREIGN PATENT DOCUMENTS

JP         63180501  A  *  7/1998

* cited by examiner

*Primary Examiner*—J J Swann
*Assistant Examiner*—Ruth C. Rodriguez
(74) *Attorney, Agent, or Firm*—Troxell Law Office, PLLC

(57) ABSTRACT

A base member for swivel caster comprises a fixed base, a rotation base and a hollow staff. The fixed base includes a ring member, and a plurality of first raceways lathed in an inward surface of the ring member. A support cavity is defined through a center of the rotation base. Assembling holes are defined in a connecting portion and communicate with the support cavity and the second raceways. During assembly, a plurality of rolling balls are extended through the assembling holes and loaded into the first raceways and the second raceways. Then a plurality of biasing balls is loaded into the assembling holes. The staff is inserted into the support cavity and blocks the assembling holes. The rolling balls contact the biasing balls instead of fixed components whereby the rolling balls swivel and rotate smoothly.

5 Claims, 5 Drawing Sheets

BASE MEMBER FOR SWIVEL CASTER

BACKGROUND OF THE INVENTION (a) Field of the Invention

The present invention relates to a base member for swivel caster, and particularly to a base member for swivel caster which swivels and rotates freely.

(b) Description of the Prior Art

As shown in FIG. 5, a conventional base member for swivel caster comprises a fixed base 10, a rotation base 20, and a plurality of rolling balls 30 loaded between the fixed base 10 and the rotation base 20. The fixed base 10 forms a plurality of assembling holes 101 through outward surface thereof. During assembly, the rolling balls 30 are extended through the assembling holes 101 and loaded between the fixed base 10 and the rotation base 20. Then the assembling holes 101 are blocked with fixed elements 40, whereby the rolling balls 30 are retained firmly. This design is disclosed in U.S. Pat. Nos. 4,316,305, 5,983,451, etc.

However, pressure of the fixed elements 40 with respect to the assembling holes 101 is uneasily controlled so that the rolling balls 30 fail to rotate freely especially when they rotate about the fixed elements 40. It is desired to overcome this defect.

SUMMARY OF THE INVENTION

Accordingly, a main object of the present invention is to provide a base member for swivel caster which has rolling balls swiveling and rotating freely therein.

The base member for swivel caster comprises a fixed base and a rotation base. The fixed base includes a ring member, and a plurality of first raceways lathed in an inward surface of the ring member. A support cavity is defined through a center of the rotation base. A connecting portion is formed on the rotation base, and a plurality of second raceways is lathed in an outward surface of the connecting portion. Assembling holes are defined in the connecting portion and communicate the support cavity and the second raceways. During assembly, a plurality of rolling balls are extended through the assembling holes and loaded into the first raceways and the second raceways. Then a plurality of biasing balls is loaded into the assembling holes. A hollow staff is inserted into the support cavity and blocks the assembling holes.

The rolling balls contact the biasing balls tangentially whereby the rolling balls rotate smoothly.

An inclined edge is formed along an end of the support cavity and inwardly projects. A guiding portion is formed on a forward edge of the staff for cooperating with the inclined edge of the support cavity whereby the staff is easily inserted in the support cavity and is prevented from disengaging from the support cavity.

DESCRIPTION OF THE PREFERRED EMBODIMENTS

Figure 1:
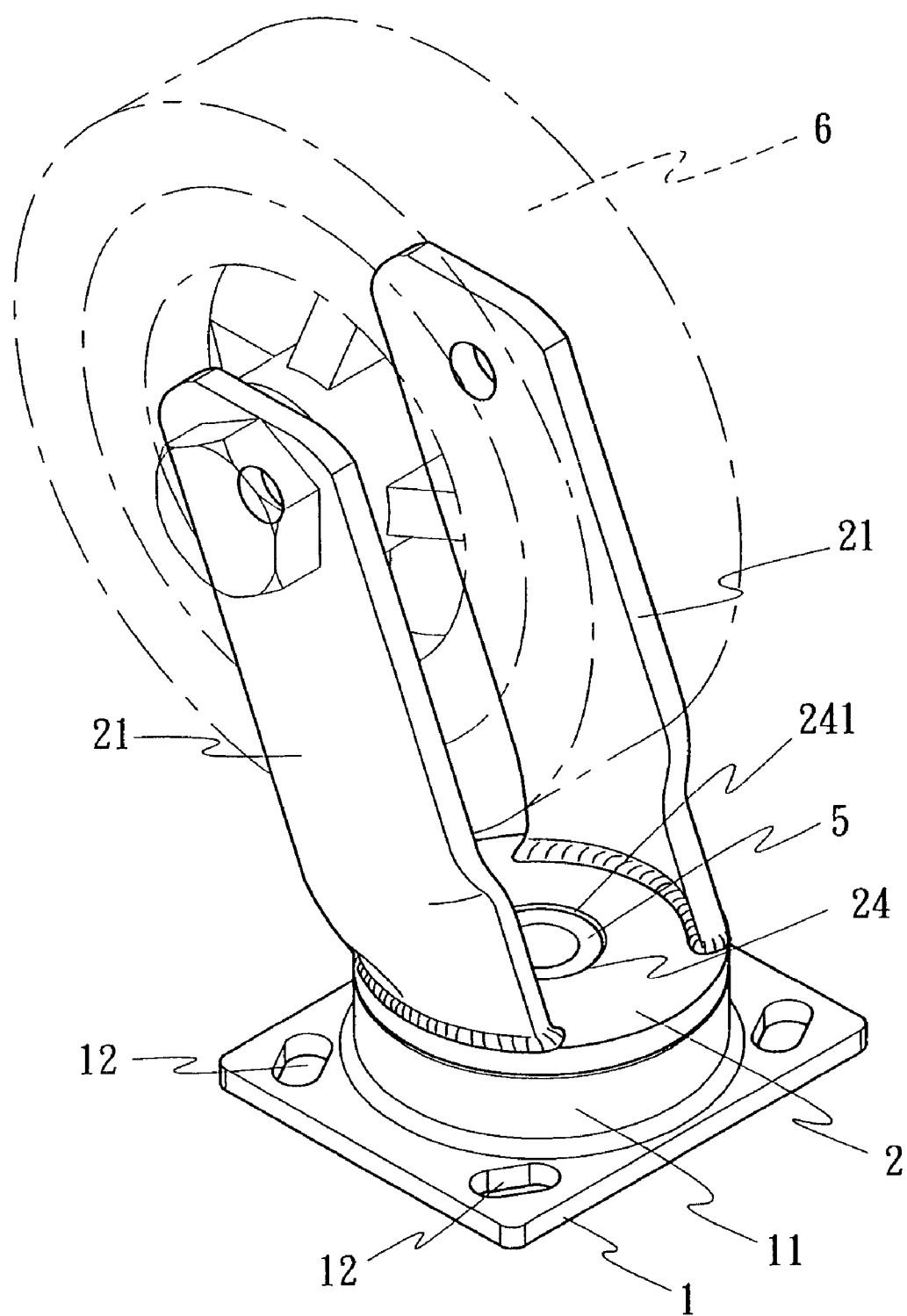
FIG. 1 is a perspective view of a base member for swivel caster according to the present invention.
Figure 2:
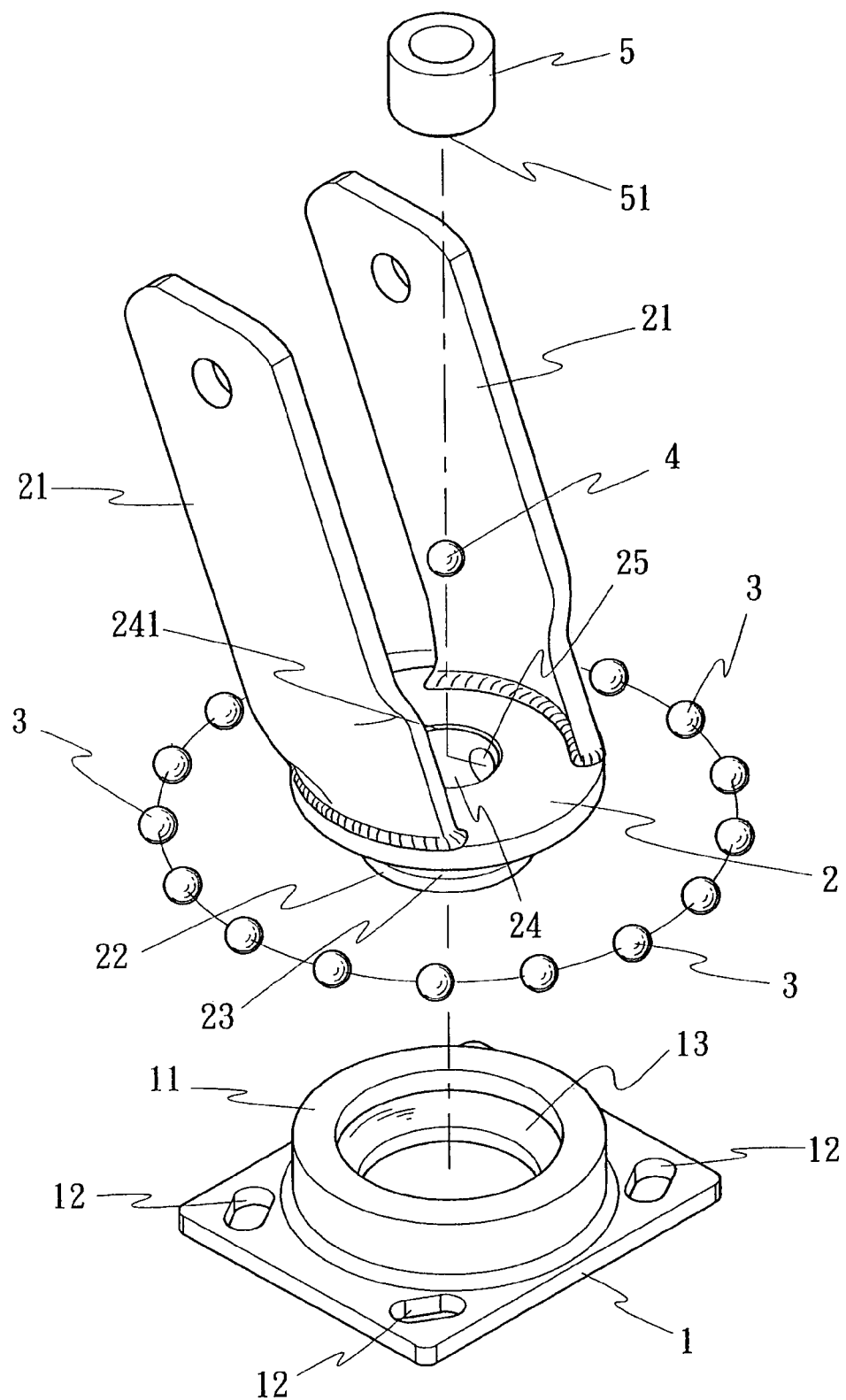
FIG. 2 is an exploded view of the base member of FIG. 1.

With reference to FIGS. 1 and 2, a base member for swivel caster in accordance with the present invention comprises a fixed base 1, a rotation base 2, a plurality of rolling balls 3, a plurality of biasing balls 4 and a staff 5.

The fixed base 1 is adapted for linking a wheel 6 to a vehicle (not shown), and includes a ring member 11 with a protrusion (not labeled) on a center thereof. A plurality of lock holes 12 is defined in the ring member 11 and around the protrusion. A plurality of hemispherical first raceways 13 is lathed in an inward surface of the ring member 11.

The wheel 6 pivots to the rotation base 2. The rotation base 2 is annular and engages with the fixed base 1. A pair of support plates 21 upwardly extends from opposite sides of the rotation base 2 for supporting the wheel 6. An annular connecting portion 22 is formed on the rotation base 2 and opposite to the support plates 21. The connecting portion 22 has an outer peripheral narrower than an inner peripheral of the ring member 11. A plurality of hemispherical second raceways 23 is lathed in an outward surface of the connecting portion 22. A support cavity 24 is defined longitudinally through a center of the rotation base 2. An annular inclined edge 241 is formed along an end of the support cavity 24 and inwardly projects. Assembling holes 25 are defined in the connecting portion 22 and communicate with the support cavity 24 and the second raceways 23.

The staff 5 is made of elastic material and is hollow. An outward peripheral of the staff 5 fits for the support cavity 24. A guiding portion 51 is formed on a forward edge of the staff 5.

Figure 3:
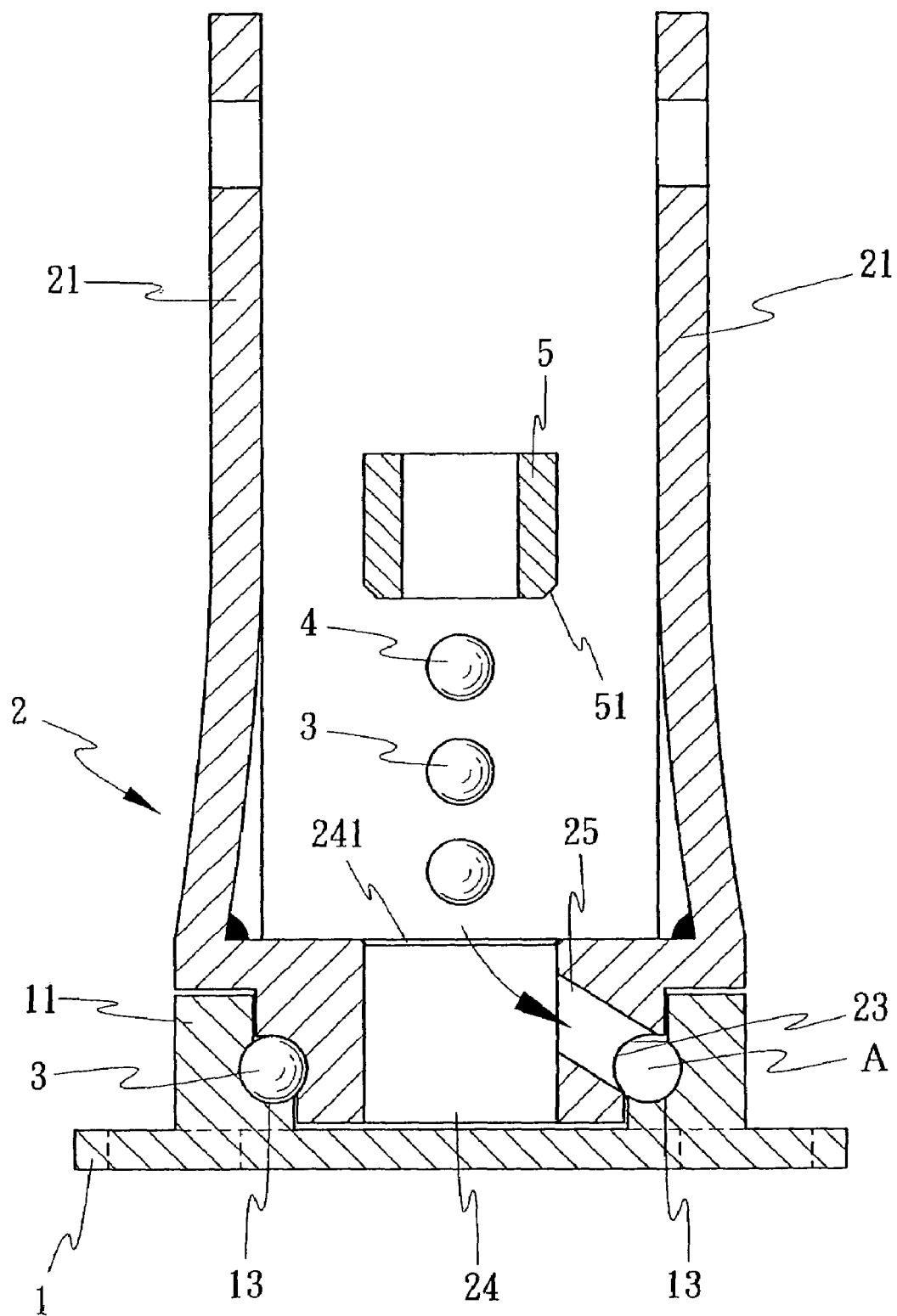
FIG. 3 shows rolling balls are loaded in the base member.
Figure 4:
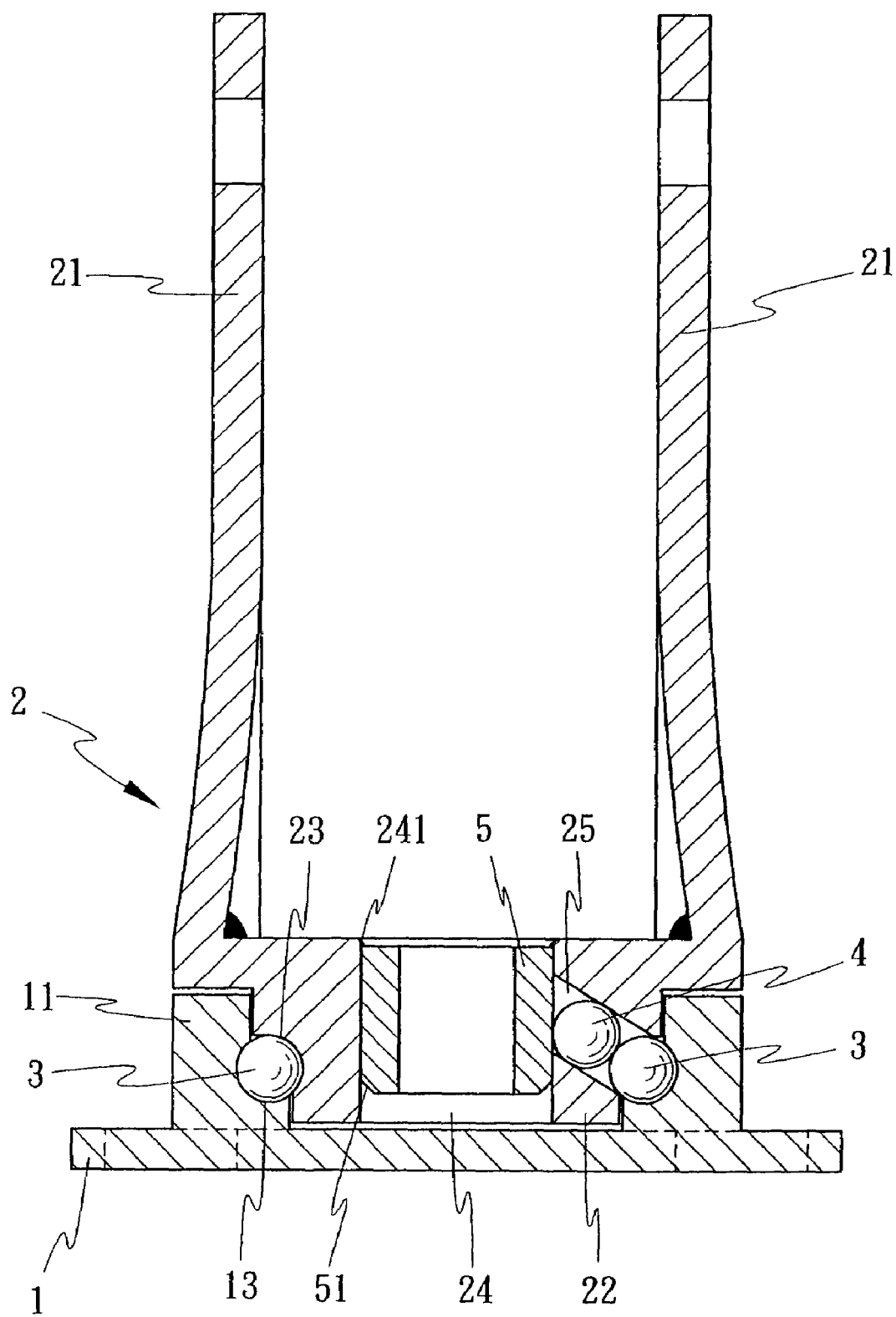
FIG. 4 is an assembled and sectional view of the base member.
Figure 5:
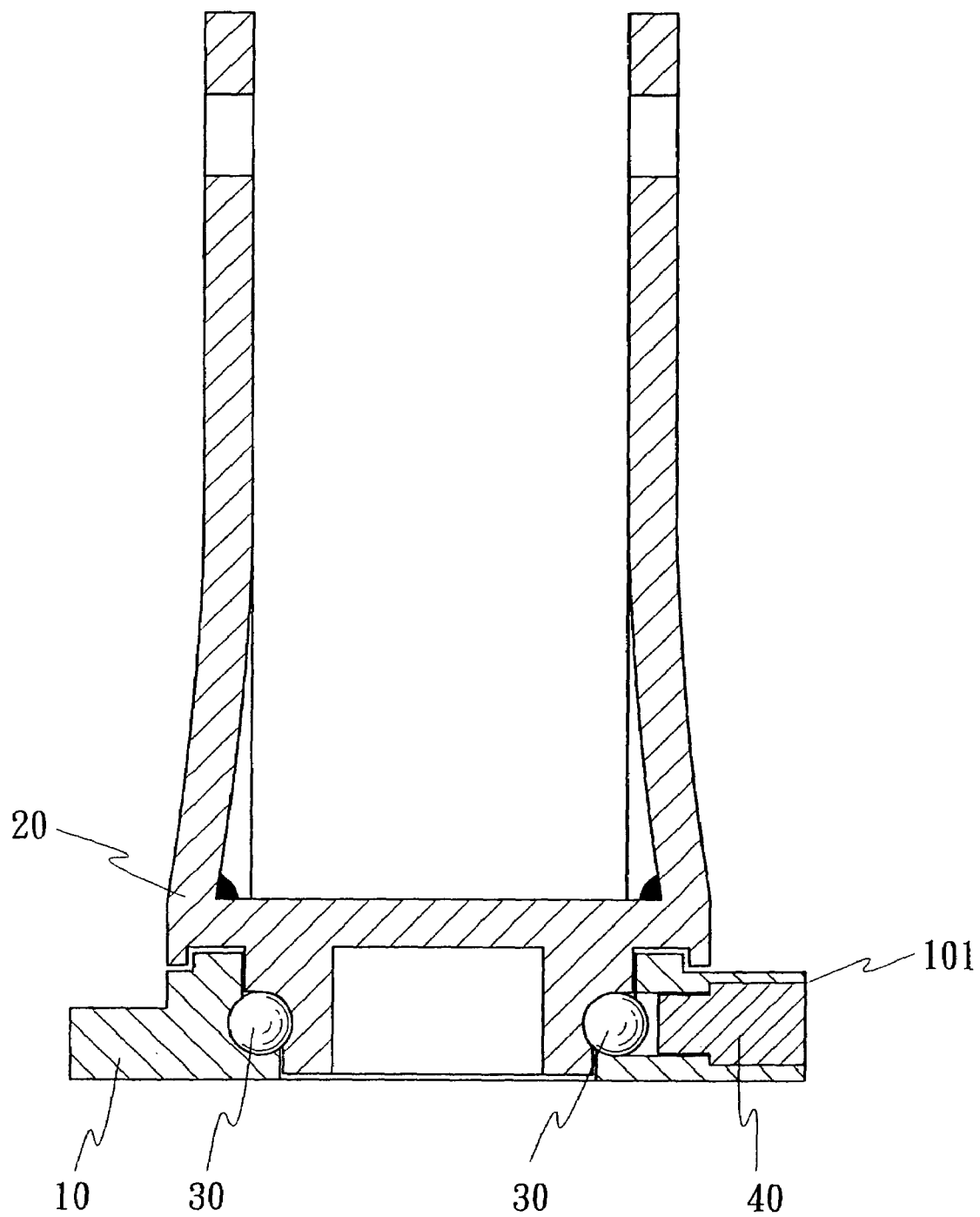
FIG. 5 is an assembled and sectional view of a conventional base member for swivel caster.

Referring to FIGS. 3 and 4, in use, the connecting portion 22 of the rotation base 2 telescopically engage to the ring member 11 of the fixed base 1. The hemispherical second raceways 23 of the hemispherical rotation base 2 and the first raceways 13 of the fixed base 1 communicate with each other and together make up of spherical ball raceways A. The rolling balls 3 are extended through the assembling holes 25 and loaded into the ball raceways A. Then the biasing balls 4 are loaded in the assembling holes 25. Sequentially, the staff 5 is inserted into the support cavity 24 and blocks the assembling holes 25. As shown in FIG. 4, the base member for swivel caster is assembled in a way that the rotation base 2 is rotatable and swivelable and guides the rolling balls 3 more freely.

According to the present invention, the rolling balls 3 rotate in relatively free space. As for the present invention, the biasing balls 4 replace the fixed component in prior art. Each biasing ball 4 has such appropriate diameter that is suitable for length of an assembling hole 25. One side of a biasing ball 4 abuts a surface of the staff 5, and another side of the biasing ball 4 is tangentially aligned with a second raceway 23. When a rolling ball 3 rolls to a corresponding position in an assembling hole 5, the rolling ball 3 only contacts the biasing ball 4 tangentially, and therefore is independent of the biasing ball 4. Consequently, the wheel 6 may swivel and rotate smoothly.

In addition, After the rolling balls 3 and the biasing balls 4 are loaded in the ball raceways A and the assembling holes 25 in the sequence, the staff 5 is extended through the support cavity 24 and blocks the assembling holes 25, thereby retains orientation of the biasing balls 4 relative to the assembling holes 25. The staff 5 is assembled without machining tools. During assembly, the guiding portion 51 on the front of the staff 5 corresponds to the support cavity 24, and a rear of the staff 5 is pulled by a hammer. The staff 5 slightly distorts and extrudes into the support cavity 24. The inclined edge 241 of the support cavity 24 effectively prevents the staff 5 from disengaging from the support cavity 24.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A base member for swivel caster comprising: a fixed base including a ring member with a protrusion on a center thereof, a plurality of hemispherical first raceways being lathed in an inward surface of the ring member; a rotation base pivoting a wheel and engaging with the fixed base, a connecting portion being formed on the rotation base, a plurality of hemispherical second raceways being lathed in an outward surface of the connecting portion, a support cavity being defined through a center of the rotation base, assembling holes being defined in the connecting portion and communicating with the support cavity and the second raceways; and a hollow staff being made of elastic material, an outward peripheral of the staff fining for the support cavity, a guiding portion being formed on a forward edge of the staff; wherein the connecting portion of the rotation base telescopically engage to the ring member of the fixed base, the second raceways of the rotation base and the first raceways of the fixed base communicate with each other and together make up of ball raceways, and during assembly, a plurality of rolling balls are extended through the assembling holes and loaded into the ball raceways, then a plurality of biasing balls are loaded in the assembling holes, and the staff is inserted into the support cavity and blocks the assembling holes, therefore the swivel caster is assembled in a way that the rotation base is rotatable and swivelable and guides the rolling balls freely.

2. The base member for swivel caster as claimed in claim 1, wherein a plurality of lock holes is defined in the ring member and around the protrusion.

3. The base member for swivel caster as claimed in claim 1, wherein the connecting portion has an outer peripheral narrower than an inner peripheral of the ring member.

4. The base member for swivel caster as claimed in claim 1, wherein each biasing ball has such appropriate diameter that is suitable for length of an assembling hole.

5. The base member of a swivel caster as claimed in claim 1, wherein an inclined edge is formed along an end of the support cavity and inwardly projects.

* * * * *